3,357,933
GRAFT POLYMERIZATION OF THIOATED HYDROXY CONTAINING POLYMERS WITH ETHYLENICALLY UNSATURATED MONOMERS
Robert W. Faessinger, Media, and John S. Conte, Ridley Park, Pa., assignors to Scott Paper Company, Delaware County, Pa., a corporation of Pennsylvania
No Drawing. Original application July 6, 1966, Ser. No. 563,055. Divided and this application Dec. 7, 1966, Ser. No. 599,704
35 Claims. (Cl. 260—17)

ABSTRACT OF THE DISCLOSURE

Peroxidic initiated graft polymerization process using as substrates dithiocarbonate or monothiocarbonate derivatives of hydroxyl group-containing or group hydrolyzable to a hydroxyl group-containing synthetic polymers and the copolymers produced by the process.

---

This invention relates to processes for producing a copolymer of an ethylenically unsaturated monomer with substantially water insoluble substrates as defined herein by periodic free radical initiated graft polymerization and to the novel copolymers produced thereby. This application is a division of application S.N. 563,055, filed July 6, 1966, as a continuation-in-part of now abandoned applications S.N. 271,491 and 271,492, filed Apr. 8, 1963; 339,324, filed Jan. 22, 1964; 345,577, filed Feb. 18, 1964; 432,816, 432,825, 432,834, 432,853, 432,855, 432,902 and 432,904, filed Feb. 15, 1965; and 491,395, filed Sept. 29, 1965.

It is an object to provide novel graft polymerization processes. Another object is to provide graft polymerization processes free from one or more of the limitations or disadvantages of prior art graft polymerization processes. It is another object to provide novel graft polymers. Other objects will be apparent to those skilled in the art to which this invention pertains.

According to the processes described herein a substantially water-insoluble, syntheic polymeric substrate as defined herein is reacted via peroxidic free radical initiated graft polymerization, with an ethylenic unsaturated monomer to produce a graft polymer.

Mino et al. U.S. Patent 2,922,768 discloses a process for graft polymerizing various polymeric materials using a ceric ion initiated system in which a reducing agent is present. The present graft polymerizations are peroxidic initiated and utilize polymeric substrates bearing substituents as defined herein which provide the other half of the redox system.

British Patent 818,412 discloses a redox graft polymerization system in which a ferrous, chromous, manganous, etc. ion is bound to the substrate by the ion exchange capacity of the substrate. The present graft polymerizations utilize sulfur containing substrates as defined herein to provide, with the peroxidic initiator, the redox system used to effect the graft polymerization.

There are problems associated with prior art graft polymerization processes, such as the need for an inert atmosphere, need to operate at either low, high or specific temperatures, use of expensive metal catalysts, use of dangerous radioactive materials (often leading to substrate degradation), need for non-aqueous system, need for concentrated reaction systems, etc. Oxidative processes using ozone or oxygen, like high-energy radiation, lead to serious strength losses of the substrate. Ceric ion-initiated chemical reactions produce excessive amounts of vinyl homopolymer. The present graft polymerizations are free from one or more of the aforesaid limitations and disadvantages. Moreover, the graft polymerizations have many advantages not possessed by other types of graft polymerizations.

The graft polymerizations described herein are novel in that both the substrate and monomer participating in the copolymerization may be of diverse nature. The substrate may be used in any of its conventional forms. The copolymerization may be accomplished as a batch process or as a continuous treatment process. Through the proper practice of each invention, strength losses can be avoided and a highly efficient addition of the monomer or monomers to the substrate is accomplished. The properties of the substrate can be modified in virtually any manner desired by the choice of monomer or combination of monomers and the amount thereof grafted to the substrate.

The present graft polymerizations can be carried out in dilute aqueous solutions of monomer or monomers, as well as in concentrated solutions of monomer or monomers. Also, each may be conducted in either dilute or concentrated suspensions of the substrate.

An inert atmosphere is not essential, but may be used if desired. A very surprising aspect of the polymerizations is monomer solution need not be entirely free from polymerization inhibitors.

Extremes of temperature are not ordinarily necessary as the copolymerization will proceed at ambient temperatures.

PEROXIDIC INITIATOR

The graft polymerizations described herein utilize a peroxidic initiator as part of the redox system. By redox system is meant the well known systems of the type described in D'Alelio, Gaetano F., Fundamental Principles of Polymerization, John Wiley and Sons, New York, 1952. Such peroxidic initiators include hydrogen peroxide, persulfates such as ammonium, sodium or potassium persulfate, hydroperoxides such as t-butyl hydroperoxide, diisopropylbenzene hydroperoxide, cumene hydroperoxide, 1 - phenylethylhydroperoxide, etc., diacylperoxides such as benzoyl peroxide, acetyl peroxide and the like, di-alkyl peroxides such as di-t-butyl peroxide, dicumyl peroxide, etc.; peresters such as t-butyl peroxyacetate, t-buyl peroxybenzoate and the like; peracids such as performic acid, peracetic acid, perbenzoic acid, peroxylactic acid and the like; and others such as dialkyl peroxydicarbonates. These peroxy compounds must be capable of initiating a free-radical polymerization by themselves or in the presence of an activator, such as a reducing agent. The preferred group of peroxidic free-radical initiators are those that are water-soluble when the copolymerization is conducted in an aqueous medium.

As would be expected, the peroxidic initiator should be uniformly distributed throughout the monomer solution.

MONOMERS

The monomers which can be co-reacted with the substrate in the manner described herein to yield new graft polymers are those ethylenically unsaturated compounds which readily copolymerize or readily copolymerize with other ethylenically unsaturated compounds either in bulk, or in an aqueous solution, or as an emulsion, when exposed to a redox system capable of initiating a polymerization or copolymerization. By the term monomer is meant an ethylenically unsaturated compound having the structure $>C=C<$ which encompasses vinylene monomers of the general form $CHR=CHR$ and vinylidene monomers of the general form $H_2C=CR_2$ and including the monomers on which all four of the open valence bonds are occupied by R substituents as well as those in which at least two R substituents, one on each carbon atom, form a ring derivative.

The radical R is selected from at least one member of the electron-accepting groups and electron-donating groups consisting of:
(1) Hydrogen.
(2) Alkyl, alkene and alkyne, the substituted as well as the unsubstituted in which the hydrocarbon moiety contains less than six carbon atoms such as methyl, ethyl, butyl, amyl, hexyl, ethenyl, hydroxymethyl, chloromethyl, etc.
(3) Aryl and substituted aryl such as phenyl, alpha-chlorotolyl, tolyl, 4-chlorophenyl, alpha-tolyl, xylyl, 2-bromo-4 ethylphenyl, etc.
(4) The electronegative groups, e.g., chloro, bromo, cyano, carboxy, carbalkoxy, acyloxyl, alkenyl, and the like.
(5) Alicyclic and heterocyclic, substituted and unsubstituted, such as pyridyl, thienyl, furyl, pyrrolidyl, etc.
(6) Groups of the general formula

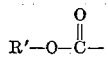

wherein R' is selected from the group consisting of hydrogen, R, and substituted as well as the unsubstituted hydrocarbons containing from 1 to 18 carbon atoms, such as methyl, ethyl, butyl, amyl, hexyl, heptyl, octadecyl, nitroethyl, nitrobutyl, N,N-dimethylaminoethyl, t-butylaminoethyl, 2-cyanoethyl, cyclohexyl, N,N-diethylaminoethyl, hydroxyethyl, hydroxypropyl and the like.
(7) Groups of the general formula

(8) Groups of the general formula

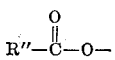

(9) Groups of the general formula

(10) Groups of the general formula

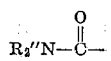

wherein R" is selected from at least one member of the group consisting of hydrogen, R or R', aliphatic groups of from 1 to 18 carbon atoms and in addition the substituted as well as the unsubstituted hydrocarbons containing from 1 to 18 carbon atoms such as the methyl, ethyl, propyl, butyl, amyl, hexyl, heptyl, octadecyl, chloroethyl, chloromethyl, hydroxyethyl, hydroxypropyl, epoxyethyl, phenyl, p-chlorophenyl, and the like.

At least one of the members of the following group of ethylenically unsaturated monomers which readily homopolymerize or readily copolymerize with other ethylenically unsaturated compounds either in bulk, or in an aqueous solution, or as an emulsion may be used: ethylenically unsaturated aromatic compounds and mono, di, tri, tetra and penta substituted aromatic compounds, wherein the ring is substituted with at least one member selected from the class consisting of alkyl (substituted and unsubstituted) having from 1 to 7 carbon atoms and/or with inorganic electron-accepting and/or inorganic electron-donating groups such as halogen, nitro, sulfono, etc., and wherein the ethylenically unsaturated moiety has from 2 to 5 carbon atoms, either substituted or unsubstituted such as alpha-methylstyrene, p-chloromethylstyrene, o-methylstyrene, m-methylstyrene, 2,4-dimethylstyrene, 2,5 - dimethylstyrene, 2,4,5 - trimethylstyrene, p-ethylstyrene, o-bromostyrene, 2-bromo-4-ethylstyrene, p-isopropylstyrene, p-chlorostyrene, 2,4-dichlorostyrene, p - bromostyrene, o - chlorostyrene, m - chlorostyrene, beta-chlorostyrene, 2,5-dichlorostyrene, 4-ethoxystyrene, p-isopropyl-alpha-methylstyrene, beta-nitrostyrene, p-nitrostyrene and the like; also polymerizable alkylacrylic acids having from 1 to 5 carbon atoms in the alkyl chain provided, in all instances, when there is no alkyl chain, the substituent is hydrogen or some other specified moiety, such as halogens, cyano etc., e.g., acrylic acid, methacrylic acid, alpha-chloroacrylic acid, 2-furfurylacrylic acid and the like; alkylacrylic acid esters having from 1 to 5 carbon atoms in the alkyl chain provided, in all instances, when there is no alkyl chain, the substituent is hydrogen or some other specified moiety, such as halogen, cyano, etc., and wherein the esters are formed from monohydric alcohols (substituted and unsubstituted) selected from the group consisting of alkyl alcohols having from 1 to 20 carbon atoms such as amyl acrylate, amyl methacrylate, benzyl methacrylate, benzyl acrylate, glycidyl methacrylate, butyl acrylate, butyl methacrylate, dodecyl acrylate, cyclohexyl acrylate, cyclopentyl methacrylate, ethyl acrylate, methyl-alpha-bromoacrylate, methyl-alpha-chloroacrylate, ethyl methacrylate, 2-ethylhexyl acrylate, heptyl acrylate, ethyl-alpha-bromoacrylate, hexyl methacrylate, lauryl methylacrylate, methyl acrylate, methyl methacrylate, stearyl acrylate, stearyl methacrylate, propyl acrylate, 2-bromoethyl acrylate, 2-chloroethoxyethyl methacrylate, etc.; the substituted amino alcohols having from 2 to 7 carbon atoms in the alkyl chain and from 1 to 7 carbon atoms in the alkyl chains on the amino moiety such as N,N-dimethylaminoethyl acrylate, N-t-butylaminoethyl methacrylate, N,N-diethylaminoethyl acrylate, 2-N-morpholinethyl methacrylate and the like; nitro alcohols wherein the alkyl chain has from 2 to 7 carbon atoms such as 3-nitro-2-butanol, 2-nitro-3-hexanol, 2-methyl-2-nitro-1-butanol, 2-nitro-2-methyl propanol, etc.; cyanoalkyl alcohols wherein the alkyl chain has from 2 to 7 carbon atoms such as 2-cyanoethyl acrylate and the like; unsaturated polymerizable alkylacrylic acid amides having from 1 to 5 carbon atoms in the alkyl chain provided, in all instances, when there is no alkyl chain, the substituent is hydrogen or some other specified moiety described above, and also wherein the amide is formed from ammonia, primary and secondary amine or a diamine having from 1 to 16 carbon atoms (substituted and unsubstituted) such as acrylamide, methacrylamide, ethacrylamide, methylene-bis-acrylamide, t-butylacrylamide, 2-cyanoacrylamide, N-(p-chlorophenyl) methacrylamide, N,N-diallylacrylamide, N,N-dimethylacrylamide, hexamethylene-bis-acrylamide, N-alpha-naphthylacrylamide, etc.; or the ethylenically unsaturated nitriles such as acrylonitrile, methacrylonitrile, ethacrylonitrile, alpha-chloroacrylonitrile and the like; polymerizable alkylene glycol and polyhydric glycol alkylacrylates and dialkylacrylates having 1 to 5 carbon atoms in the alkyl chain provided, in all instances, when there is no alkyl chain, the substituent is hydrogen or some other specified moiety described above, such as ethylene glycol dimethacrylate, triethylene glycol dimethacrylate, polyethylene glycol dimethacrylate, tetramethylene dimethacrylate, glyceryl triacrylate, hydroxyethyl methacrylate, hydroxypropyl methacrylate and the like; fatty acid esters of 1-olefins (substituted and unsubstituted), containing from 2 to 24 carbon atoms but preferably from 2 to 18 atoms wherein the 1-olefin alcohol precursor of the fatty acid esters has from 2 to 8 carbon atoms but preferably 2 to 3 carbon atoms, such as, vinyl acetate, vinyl propionate, vinyl butyrate, isopropenylacetate, vinyl-n-hexanoate, vinylchloroacetate, vinylcrotonate, vinyl-n-decanoate, vinyl-formate, vinyl-2-ethyl hexoate, vinyl laurate, vinyl oleate, vinyl stearate, vinyl trifluoroacetate, allyl linolate, allyl oleate, allyl acetate, allyl propionate, allyl chloroacetate, allyl caproate, allyl butyrate, etc.; aromatic acid esters (substituted and unsubstituted) of unsaturated alcohols wherein the alcohol precursor has from 2 to 8 carbon atoms but preferably from 2 to 3 carbon atoms such as allyl benzoate, diallyl phthalate, vinyl phthalate, vinyl benzoate, etc.; ethylenically unsaturated aliphatic diacids containing from 4 to 10 carbon atoms but preferably from 4 to 6 carbon atoms, and their esters, nitriles and amides such as, itaconic acid, maleic acid, fumaric acid, dimethyl maleate, dibutyl maleate, dimethyl fumarate, dibutyl fumarate, maleic anhydride, diethyl fumarate, etc.; polymerizable aliphatic dienes such as butadiene, 2,3-dimethyl butadiene, isoproprene, pentadiene, etc. and the haloprenes such as chloroprene and the like; 1-olefins (substituted and unsubstituted) containing from 2 to 18 carbon atoms but preferably from 2 to 8 carbon atoms such as vinyl chloride, vinylidene chloride, allylamine, diallylamine, diallylphosphate, allyl chloride, nitroethylene, butadiene monoxide, vinyl acrylate and the like; the vinyl ethers (substituted and unsubstituted), such as vinylethyl ether, vinylpropyl ether, vinylisobutyl ether, vinyl-2-methoxyethyl ether, vinyl-n-butyl ether, vinyl 2-chloroethyl ether, vinyl-2-ethylhexyl ether and the like or other vinyl compounds such as divinylsulfone, divinylsulfide, divinylbenzene, etc.; ethylenically unsaturated heterocyclic compounds wherein the heterocycle contains from 3 to 5 carbon atoms and the hetero atoms are selected from the group consisting of N, O and S such as the vinyl pyridines, N-vinyl pyrrolidone, vinyl furan, alpha vinyl thiophene and the like. In general, the only requirement necessary in order for a monomer to be useful in this invention is that it has at least one olefinic double bond which readily homopolymerizes or readily copolymerizes with other ethylenically unsaturated compounds either in bulk, or in an aqueous solution, or as an emulsion.

More specifically, at least one member of the following group of polymerizable or copolymerizable monomers is useful; styrene, p-chloromethyl styrene, sodium p-styrene-sulfonate, vinyl toluene, 2,5-dichlorostyrene, alpha-methyl styrene, acrylamide, acrylic acid, acrylonitrile, N-t-butyl acrylamide, methacrylamide, N,N-methylene-bis-acrylamide, N,N-diethylacrylamide, methacrylic acid, t-butylaminoethyl methacrylate, N,N-diethylaminoethyl acrylate, N,N-diethylaminoethyl methacrylate, N,N-dimethylaminoethyl acrylate, 2-cyanoethyl acrylate, n-butyl acrylate, n-butyl methacrylate, decyl acrylate, decyl methacrylate, ethyl acrylate, 2-ethylhexyl acrylate, ethyl methacrylate, glycidyl acrylate, glycidyl methacrylate, n-hexyl methacrylate, n-lauryl methacrylate, methyl acrylate, methyl methacrylate, decyl-octyl methacrylate, stearyl methacrylate, ethylene glycol dimethacrylate, triethylene glycol dimethacrylate, tetraethylene glycol dimethacrylate, polyethylene glycol dimethacrylate, hydroxypropyl methacrylate, hydroxyethyl methacrylate, diallyl adipate, diallyl maleate, N,N-diallyl melamine, diallyl phthalate, diallyl phosphite, diallyl phosphate, diallyl fumarate, vinyl chloride, vinylidene chloride, maleic acid, itaconic acid, fumaric acid, di-n-butyl fumarate, di-n-butyl maleate, di-n-butyl itaconate, diethyl maleate, methyl vinyl ketone, 2-methyl-5-vinylpyridine, N-vinyl carbazole, 2-vinyl pyridine, 1-vinyl-2-pyrrolidone, N-vinyl pyrrolidone, vinyl-n-butyl ether, vinyl-isobutyl ether, vinyl-2-chloroethyl ether, vinyl ethyl ether, vinyl-2-ethylhexyl ether, vinyl triethoxysilane, vinyl stearate, vinyl butyrate, vinyl acetate, vinyl-2-ethyl-hexoate, vinyl propionate, divinyl benzene and divinyl sulfone.

SUBSTRATES

The water-insoluble substrates utilized in the graft polymerization processes described herein are thioated synthetic polymers containing hydroxyl groups or groups hydrolyzable thereto, including thioated cellulose ethers and esters.

The term "substantially water-insoluble" means a substrate whose solubility, in the form in which it is employed, in water at 30° C. or less does not exceed about 10 percent of its weight. Because the substrate used in the graft polymerizations described herein is usually formed under alkaline conditions, both it and the polymeric substance from which it is formed must also be substantially alkaline insoluble, at least at the alkaline pH used to form the substrate and to graft polymerize, if alkaline conditions are employed.

The thioated substrates are, except as otherwise stated herein, dithiocarbonate derivatives and monothiocarbonate derivatives of the parent polymer. These thioated substrates can be produced by the reaction of the alkaline wet parent polymer with carbon disulfide and carbonylsulfide, respectively.

The term "synthetic polymers containing hydroxyl groups or groups hydrolyzable to hydroxyl groups" means polymers capable of forming a thioate (dithioate or monothioate) derivative in the presence of a base. For example, esters of hydroxyl polymers having no free hydroxy groups but which are at least slightly hydrolyzed in the presence of a base so that a thioate derivative may be produced therefrom are included within the term. Examples of such polymers are polyvinyl alcohol, partially saponified polyvinyl acetate, polyvinyl acetate, copolymers of polyvinyl alcohol and copolymers of polyvinyl acetate, copolymers of vinyl acetate, e.g., copolymers of vinyl acetate and styrene, vinyl acetate and ethylene, vinyl acetate and vinyltoluene, vinyl acetate and isoprene, vinyl acetate and divinylsulfone, vinyl acetate and vinylidine chloride, and the like, as well as the hydrolysis products of copolymers of these types, and polymers and copolymers of hydroxyethylacrylate, e.g., hydroxyethylacrylate, copolymers of hydroxyethylacrylate and styrene, hydroxyethylacrylate and isoprene, hydroxyethylacrylate and acrylonitrile, hydroxyethylacrylate and ethylacrylate, etc., and polymers and copolymers of hydroxyethylmethacrylate, e.g., poly(hydroxyethylmethacrylate), copolymers of hydroxyethylmethacrylate and vinyltoluene, hydroxyethylmethacrylate and butadiene, hydroxyethylmethacrylate and vinylpyridine, etc., and polymers and copolymers of hydroxypropylacrylate and hydroxypropylmethacrylate, e.g., poly(hydroxypropylacrylate), poly (hydroxypropylmethacrylate), copolymers of hydroxypropylmethacrylate and butylacrylate, hydroxypropylacrylate and vinylidine chloride, hydroxypropylmethacrylate and isoprene, etc., can be used to produce the thioated substrate.

Included in this broadly defined class of synthetic polymers are ethers and esters of cellulose, i.e., derivatives of cellulose in which a portion of the hydroxy groups of cellulose has been etherified or esterified, e.g., cellulose monoacetate, cellulose diacetate, cellulose triacetate, cellulose propionate, cellulose acetate propionate, cellulose acetate butylate, nitrocellulose, methyl cellulose, ethyl cellulose, hydroxyethyl cellulose, propyl cellulose, butylcellulose, carboxymethylcellulose, the degree of substitution being such that a thioated derivative can be produced which is substantially water insoluble.

These synthetic polymers can be used in their conventional forms, i.e., as powders or in the form of sheets, films, fibers, filaments, woven cloth, knitted fabrics, garments, etc.

DESCRIPTION OF PROCESS

A. THIOATED SUBSTRATE FORMATION

The term "thioated substrate" embraces dithiocarbonated and monothiocarbonated substrates and the corresponding substrates produced by disproportionation or rearrangement during mono- or di-thiocarbonation.

The thioated substrate which is graft polymerized can be prepared by wetting the corresponding non-thioated substrate with an alkaline solution. This is done, generally, with a sodium hydroxide solution, or a solution of some other alkali metal hydroxide. The strength of the alkaline solution used in each particular case will be dependent, of course, upon the nature of the substrate and the type of end-product desired; but generally, concentrations in the range of about .05 molar to about 1 molar are preferred. The amount of alkali or alkaline salt or mixtures of alkalies and alkaline salts used is that amount necessary to achieve the desired degree of thiocarbonation of the substrate. Unless a very high or very low degree of thioation is desired, the amount of alkali employed is not particularly critical so long as it does not result in the production of a water soluble thioate. Such alkalies as lithium, sodium, potassium, rubidium, and cesium hydroxides, ammonium hydroxide, quaternary ammonium hydroxides such as tetramethylammonium hydroxide, methyltriethylammonium hydroxide, trimethylbenzylammonium hydroxide and the like, quaternary phosphonium hydroxides such as tetraethylphosphonium hydroxide, trimethylphenylphosphonium hydroxide, methyltriethylphosphonium hydroxide, trimethylisoamylphosphonium hydroxide, and the like, sulfonium hydroxides such as triethylsulfonium hydroxide, methyldiethylsulfonium hydroxide, dimethylbenzylsulfonium hydroxide, methyldiethylsulfonium hydroxide and the like, quaternary arsonium hydroxides such as trimethylphenylarsonium hydroxide, tetraethylarsonium hydroxide methyltriphenylarsonium hydroxide and the like, and quaternary stibonium hydroxides such as tetramethylstibonium hydroxide, tetraethylstibonium hydroxide, methyltriethylstibonium hydroxide and the like, as well as the slightly soluble alkaline earth metal hydroxides such as calcium, strontium, barium, etc. may be used, although the preferred method of preparation of the alkaline earth metal substrate thiocarbonate salts is from the alkali metal substrate thiocarbonate salts by metathesis. An alkali metal substrate thiocarbonate salt may also be converted to a quaternary ammonium, sulfonium, quaternary phosphonium, quaternary arsonium or quaternary stilbonium substrate thiocarbonate through metathesis.

In addition to the strong and relatively strong bases mentioned above, basic salts, and water soluble organic amines serve equally well. Such basic salts, or mixtures of these salts as sodium carbonate, trisodium phosphate, disodium hydrogen phosphate, disodium ammonium phosphate, sodium silicate, sodium aluminate, sodium antimoniate, sodium stannate, sodium cyanide, sodium cyanate, sodium sulfide, potassium carbonate, tripotassium phosphate, dipotassium phosphate, potassium silicate, potassium aluminate, potassium antimoniate, potassium stannate, potassium cyanide, potassium cyanate, potassium sulfide, lithium carbonate, trilithium phosphate, dilithium hydrogen phosphate, lithium silicate, and the like, as well as such water-soluble amines as methylamine, ethylamine, dimethylamine, pyridine, and such quaternary ammonium hydroxides as tetramethylammonium hydroxide and benzyltrimethylammonium hydroxide are just a few examples of basic materials which have served equally well in the preparation of the various water-insoluble thiocarbonates. In fact, a basic salt whose aqueous solution has a pH of about 8 or 9 or greater may be suitable. It should be recognized, also, that a mixture consisting of a basic salt and an inorganic or organic hydroxide is included in this group. However, those basic salts which are known to chemically modify the substrate and which would thereby interfere with the thiocarbonation process are to be avoided when practicing this invention.

Thiocarbonation can be accomplished by bringing the alkaline-wet substrate into intimate contact with carbon disulfide or carbonyl sulfide. Either vaporous carbon disulfide or carbonyl sulfide or a solution of the sulfide in any inert solvent or an aqueous emulsion of the sulfide in an inert water immiscible organic solvent may be used. The thiocarbonation reaction is conducted as long as is necessary to acquire the desired degree of thiocarbonation. Usually merely exposing the alkaline substrate to the carbonyl sulfide or carbon disulfide suffices.

Thiocarbonation is of a relatively low order, i.e., substrates are produced having thioate sulfur contents of the order of 0.5 percent and usually 0.3 percent or less. This low thiocarbonation is, of course, vital when it is possible to produce a water-soluble thioated substrate.

The techniques known in the art can be used to produce water insoluble thioated substrates, e.g., using carbon disulfide in the presence of alkali to produce a dithiocarbonated substrate and carbonyl sulfide in the presence of alkali to produce a monothiocarbonated substrate.

A wide variety of thiocarbonate salts can be produced by reacting, by metathesis, an ammonium, organic ammonium, phosphonium, sulfonium, arsonium, stibonium salt or an alkali metal salt such as lithium, sodium, potassium, etc. of the thiocarbonate of the substrate with a water-soluble salt of a metal or mixture of metals from Group Ib of the Periodic Table such as Cu, Ag, and Au; Groups IIa and IIb such as Mg, Ca, Sr, Zn, Cd, etc.; Groups IIIa and IIIb such as Sc, Y, La, Al, Ga, etc. Group IVb such as Ti, Zr, etc., as well as Ge, Sn and Pb; Group Vb such as V, Nb, etc.; as well as Bi; Group VIb such as Cr, W, etc.; Group VIIb such as Mn, etc.; and Group VIII such as Fe, Co, Ni, Os, etc., to yield a new thiocarbonate derivative of the metal.

In general, the previously described alkali metal salts of the thiocarbonate are used if copolymerization is to be carried out without undue delay. At times, however, it is advantageous to effect a conversion of the alkali metal thiocarbonate salt to a salt which is more stable, or which is a more reactive intermediate. For example, aluminum thiocarbonate of the substrate is prepared by passing an aluminum sulfate or aluminum acetate solution through, about, or over an alkali metal thiocarbonate of the polymeric substrate. The zinc thiocarbonate of the substrate is prepared from zinc chloride or some other soluble zinc salt, zirconyl thiocarbonate from zirconium oxychloride, uranyl thiocarbonate from uranyl acetate, lead thiocarbonate from lead acetate, and ferrous thiocarbonate from ferrous ammonium sulfate or ferrous chloride, etc. This technique is especially useful when a soluble hydroxide or basic salt of the desired cation is non-existent or unavailable.

The thioated substrate, when graft polymerized with the monomer, must be substantially free from any water-soluble by products of the thioate formation or thioate substrate decomposition, i.e., decomposition of thioate groups, which are known in the art to be labile. Thus, after its formation the thioated substrate, in the form of an alkali metal salt, alkaline earth metal salt, or an ammonium salt, or the previously described converted metal salts, is washed with water to remove water-soluble reaction by-products and free metal ions, preferably immediately prior to its suspension in an emulsion or solution of the polymerizable ethylenically unsaturated monomer to ensure no further formation of by-products prior to polymerization.

The structures of the thioated substrates are not certain. However, in the case of the monothiocarbonate derivatives, they are believed to have the formula

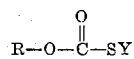

or its disproportionated or rearranged moiety, e.g.,

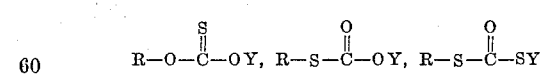

in which R is the polymer substrate and Y is hydrogen or a salt derivative of the acid. Similarly, in the case of the dithiocarbonates, they are believed to have the formula

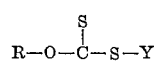

or its disproportionated or rearranged moiety, e.g.,

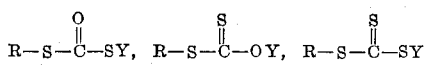

wherein R and Y have the values given above.

B. POLYMERIZATION

Graft polymerization is accomplished by reacting the thioate derivative of the substrate, either as a salt or the corresponding free acid obtained by converting an ammonium, organic ammonium, sulfonium, phosphonium, arsonium, stibonium, or an alkali metal salt of the thiocarbonate derivative to the free thiocarbonic acid derivative, with an ethylenically unsaturated monomer or monomers from one of the groups set out above in the presence of a peroxidic free radical initiator.

The copolymerization reaction is conducted in either an aqueous or nonaqueous system, but preferably and ordinarily in an aqueous system, in which the monomer is uniformly distributed. When the reaction medium is aqueous, a solution, suspension, or an emulsion of the ethylenically unsaturated monomer can be used to achieve uniform distribution of the monomer. The presence of a wetting agent in the reaction medium is advantageous since it facilitates monomer penetration into the thioate substrate. Emulsifiers can be used to achieve a uniform emulsion of an insoluble monomer and/or peroxidic initiator.

The selected thiocarbonate salt or free acid can be used in virtually any proportion to the monomer, e.g., from about 0.5 percent to 99.9 percent by weight based on the ethylenically unsaturated monomer. The monomer can also be used in almost any concentration in the solution, e.g., from about 1 percent to about 100 percent of the total reaction solution. The solution can be buffered, if necessary, or its pH adjusted to provide the best polymerization conditions for the selected monomers. After adding a water soluble peroxidic free-radical initiator to the solution containing the substrate and monomer, the reaction will proceed at virtually any temperature, e.g., from about 0° to about 100° C. Reaction times can vary from 3 minutes to about 96 hours or longer and reaction pressure can be atmospheric, subatmospheric or superatmospheric, depending upon the monomer and the type of product desired. The thioated substrate can also be added to a mixture of the monomer and peroxidic initiator in the selected reaction media. The usual graft polymerization techniques employing a peroxidic initiated system can be used. However, because of the ease of graft polymerization, less rigorous conditions are ordinarily required. For example, mildly acidic aqueous conditions at room temperature are sufficient to achieve any degree of monomer add-on desired, e.g., from 5 percent to 500 percent.

As is well known in the art, the properties of the graft polymer produced depends upon the substrate used, the monomer or mixture of monomers used, the percent of add-on of monomer achieved, and the reaction conditions employed.

The graft polymer can, if desired, be purified using conventional techniques, e.g., to remove sulfur containing products, monomer, homopolymer, alkali, etc.

In the practice of this invention, it is possible to design the final macromolecular products so that they have a wide range of properties by controlling the extent or degree to which thiocarbonate groups have been added to the synthetic, polymeric substrate. For example, it is possible to introduce a few thiocarbonate groups per polymer molecule by merely reacting a very small percentage of the reactive sites present in the polymeric substrate with carbonyl sulfide or carbon disulfide; on the other hand, all or nearly all of the reactive sites may be converted to thiocarbonate groups. It is preferred, however, that the degree of thiocarbonation be such that there is no apparent outward change in the physical form of the thiocarbonated derivative, nor that the thiocarbonate derivative becomes soluble in water. Also, all or substantially all water-soluble by-products arising from the thiocarbonation reaction ought to be removed prior to the copolymerization, e.g., by washing. The thiocarbonate substrate may be used in the subsequent polymerization step either as the half ester of thiocarbonic acid, or as a salt of the half ester of thiocarbonic acid. The salt may be that of any of the metallic elements of the Periodic Table as well as ammonia. In addition, the salt may be that of an organic species which possess a positive charge, such as the organic ammonium, phosphonium, sulfonium, arsonium and stibonium groups. The metal ions may be monovalent or multivalent, and if the metal ion is in a lower valence state, e.g., $Fe^{++}$, it makes an excellent contribution to the redox system.

Because the thioate groups of the substrate are unstable, it is preferred that the graft polymerization process be part of a multiple step process comprising (a) forming the thioated substrate, (b) washing the substrate with water to remove the water-soluble by-products of the thioate step, and (c) mixing the freshly washed thioated substrate with the monomer-peroxidic initiator solution to initiate polymerization. Homopolymer formation can sometimes be significantly reduced by employing these steps as part of an uninterrupted sequence, at least the washing and polymerization steps.

GRAFT POLYMERIZATION OF HYDROXYL-GROUP CONTAINING SYNTHETIC SUBSTRATES

Because many synthetic polymers containing hydroxyl group or groups hydrolyzable thereto are decomposed or solubilized by alkali, care must be taken when producing their thioated derivatives to avoid such adverse alteration of the substrate. It is to be understood that if the substrate contains only groups hydrolyzable to hydroxyl groups, some chemical modification of the substrate by the alkali used appears necessary in order to form the thioate groups. However, this involves a minimum of modification and need not, and preferably does not involve a substantial change in the hydroxyl number or depolymerization. Ordinarily, wetting of the polymer with alkali at or below ambient temperature is all that is required. The choice of alkali and its strength will, of course, depend upon the sensitivity of the selected polymer to the base. Sodium hydroxide concentrations of about 0.05 to one molar are preferred.

In order to describe the present invention so that it may be more clearly understood, the following examples are set forth in which all parts are expressed in parts by weight unless otherwise stated. These examples are set forth primarily for the purpose of illustration, and any specific enumeration of detail contained should not be interpreted as a limitation on the concept of this invention.

*Example 1a*

Five parts of polyvinyl alcohol (Air Reduction Chemical Company, KR–30) were placed in a beaker containing enough 0.063 M sodium hydroxide solution to cover it completely for ¼ hour and then filtered on a Büchner funnel. The resultant alkaline-wet polvinyl alcohol was then placed in an evacuated vacuum desiccator over carbon disulfide for about 2½ hours in order to form a dithiocarbonate derivative of the polyvinyl alcohol. This dithiocarbonated polyvinyl alcohol was first suspended in about 100 parts of water, filtered on a Büchner funnel, and washed on the Büchner funnel with water (300–400 parts) in order to remove all soluble by-products which had formed during the dithiocarbonation process. After washing, the moist dithiocarbonated polyvinyl alcohol was suspended in a previously prepared emulsion consisting of 4.0 parts acrylonitrile, 45 parts water, 0.2 part Tween–85 (a polyoxyethylene sorbitantrioleate), and 1.5 parts of 30% hydrogen peroxide. After standing at room temperature (25°–27° C.) for 18 hours, the copolymerized polyvinyl alcohol was removed from the polymerization mixture and thoroughly washed with water. The product, oven dried, weighed 7.54 parts which constitutes a 83.7% yield of the theoretical. Prolonged extraction of this material with dimethylformamide indicated that 91.3% of the monomer which had been converted to polymer was non-extractable.

*Example 2a*

Five parts of polyvinyl alcohol were dithiocarbonated in the manner described in Example 1a, above. The dithiocarbonated polyvinyl alcohol was then washed thoroughly on a Büchner funnel with water to remove soluble by-products and then 100 parts of 0.06 M lead acetate solution were passed over and through the polyvinyl alcohol derivative to form lead polyvinyl alcohol dithiocarbonate by metathesis. The lead product, after washing with sufficient water (150–200 parts) to remove excess lead ions, was added to an emulsion prepared from 3.75 parts styrene, 0.25 parts acrylonitrile, 45 parts of distilled water, 0.5 part of Tween–85 and 1.5 parts of 30% hydrogen peroxide. After 18 hours contact at room temperature with this emulsion, the polyvinyl alcohol copolymer was washed well with water and dried. The yield of copolymer amounted to 7.55 parts which constitutes an 83.0% yield of the theoretical. Prolonged extraction with trichloroethane showed that 70% of the monomer which had been converted to copolymer could not be removed.

*Examples 3a–8a*

Five parts of polyvinyl alcohol were dithiocarbonated and converted to various polyvinyl alcohol dithiocarbonate salts by metathesis in the manner described in Example 2a. Each dithiocarbonate derivative was suspended for 18 hours in a polymerization mixture as that described in Example 1a before being process for yields. Some of the results, representative of the various polyvinyl alcohol dithiocarbonate salts used, are tabulated below:

| Example No. | Cation | Percent theoretical yield | Percent nonextractable copolymer |
|---|---|---|---|
| 3a | Aluminum | 82 | 92 |
| 4a | Lead | 83 | 96 |
| 5a | Ferrous | 79 | 99 |
| 6a | Zinc | 81 | 87 |
| 7a | Cobalt | 73 | 73 |
| 8a | Nickel | 67 | 75 |

*Example 9a*

Five parts of polyvinyl alcohol were dithiocarbonated in the manner described in Example 1a and the resultant sodium polyvinyl alcohol dithiocarbonate was converted by metathesis to aluminum polyvinyl alcohol dithiocarbonate by substituting 0.06 M aluminum acetate for 0.06 M lead acetate as illustrated in Example 2a, and suspended in an emulsion consisting of 5.0 parts acrylamide, 50 parts water, and 1.5 parts of 30% hydrogen peroxide. After 18 hours at room temperature (25°–27° C.), the product was washed thoroughly with warm water and dried. The yield of copolymer amounted to 6.2 parts which constitutes a 24% conversion of monomer to unextractable polymer.

*Example 10a*

Five parts of polyvinyl alcohol were dithiocarbonated as described in Example 1a and the resultant sodium dithiocarbonate of polyvinyl alcohol converted to the zinc salt with 0.06 M zinc acetate by metathesis. The zinc derivative was suspended in an emulsion prepared from 4.5 parts ethyl acrylate, 45 parts water, 0.2 part Tween–85 and 1.5 parts of 30% hydrogen peroxide. After 18 hours at room temperature, the polyvinyl alcohol copolymer was washed with water and dried. The copolymeric product amounted to 7.73 parts which constitutes an 81.5% yield of the theoretical. Prolonged extraction of the product with acetone indicated that 60.2% of the monomer which had been converted to polymer could not be extracted.

*Example 11a*

Five parts of polyvinyl alcohol were placed in a beaker containing sufficient 0.25 M sodium silicate solution to cover it completely. This mixture was allowed to remain at room temperature for about 1¼ hours then filtered on a Büchner funnel to remove excess silicate solution. The sodium silicate wetted polyvinyl alcohol was then placed in an evacuated vacuum desiccator over carbon disulfide for about 1¼ hours before washing the product in water and filtering on a Büchner funnel. Immediately after washing, the dithiocarbonated polyvinyl alcohol was converted from the sodium salt to the aluminum salt by methathesis with aluminum acetate as in Example 9a and suspended in an emulsion containing 4.0 parts acrylonitrile, 45 parts water, 0.2 part Tween-85 and 1.5 parts 30% hydrogen peroxide. After 18 hours in the reaction medium, the polyvinyl alcohol copolymer was washed thoroughly with water, yielding a dried product which amounted to (6.88 parts) 76.5% of the theoretical yield. Prolonged extraction of this copolymer with dimethyl formamide indicated that 72% of the monomer which had been converted to polymer could not be extracted.

*Example 12a*

Five parts of polyvinyl alcohol were sodium dithiocarbonated as described in Example 11a and immediately thereafter converted to the lead salt as described in Example 2a. The lead polyvinyl alcohol dithiocarbonate was added to an emulsion consisting of 4.5 parts of ethyl acrylate, 45 parts water, 0.2 part Tween–85 and 1.5 parts of 30% hydrogen peroxide. After 18 hours at room temperature the polyvinyl alcohol copolymer was washed well with water and dried. The yield of copolymer amounted to 82.3% (7.8 parts) of the theoretical of which 71.2% of the monomer which had been converted to polymer was non-extractable with acetone.

*Example 13a*

Five parts of polyvinyl alcohol were dithiocarbonated as described in Example 11a. This sodium dithiocarbonated PVA was then converted by metathesis to ferrous polyvinyl alcohol dithiocarbonate by substituting 0.06 M ferrous ammonium sulfate for 0.06 M lead acetate, as described in Example 2a, and then suspended in a solution consisting of 5.0 parts acrylamide, 45 parts of water, and 1.5 parts of 30% hydrogen peroxide. Upon standing at room temperature for 18 hours, the polyvinyl alcohol copolymer was removed from the polymerization mixture and thoroughly washed with water. The dried product weighed 6.3 parts which constitutes a 25.4% conversion of monomer to unextractable polymer.

*Example 14a*

Five parts of polyvinyl alcohol were placed in a beaker with enough 5% ammonium hydroxide to cover it completely. After about ¼ hour, the polyvinyl alcohol was filtered free of excess ammonium hydroxide solution on a Büchner funnel and then placed in a vacuum desiccator containing carbon disulfide for 3 hours. The resultant product was suspended in about 100 parts of water and followed by filtration on to a Büchner funnel. After further washing with water on the Büchner funnel, the dithiocarbonated polyvinyl alcohol was suspended in an emulsion consisting of 3.75 parts of styrene, 0.25 part acrylonitrile, 45 parts water, 0.5 part Tween–85, and 1.5 parts 30% hydrogen peroxide, which had been adjusted to about pH 3.0 with dilute hydrochloric acid. After 18 hours in this emulsion, the copolymerized polyvinyl alcohol was washed thoroughly with water. The dried product amounted to 67.8% (6.1 parts) of the theoretical yield and 63.2% of the monomer which had been converted to polymer could not be extracted with trichloroethane.

Example 15a

Five parts of polyvinyl alcohol were placed in a beaker and enough 0.25 M sodium carbonate was added to cover the polyvinyl alcohol. The mixture was allowed to stand at room temperature for about ½ hour and then filtered on a Büchner funnel.

This alkaline-wet polyvinyl alcohol was next placed in an evacuated vacuum desiccator over carbon disulfide. After about 4 hours, the dithiocarbonated polyvinyl alcohol was suspended in about 100 parts of water, filtered on a Büchner funnel, washed with water (150–200 parts) and immediately converted to the zinc salt by metathesis, as described in Example 10a, and then suspended in an emulsion consisting of 3.75 parts of styrene, 0.25 part of acrylonitrile, 45 parts of water, 0.5 part of Tween–85 and 1.5 parts of 30% hydrogen peroxide. After 18 hours, the copolymerized polyvinyl alcohol was washed with water and dried. The product yield amounted to 6.95 parts which constitutes 76.5% yield of the theoretical. Prolonged extraction in trichloroethane indicated that 52.4% of the monomer which had been converted to polymer could not be extracted.

Example 16a

Five parts polyvinyl alcohol were placed in a beaker and enough 4% triethylamine solution was added to cover the polyvinyl alcohol. This mixture was allowed to stand at room temperature for about ¼ hour, filtered and dithiocarbonated for 5 hours as described in Example 15a. The dithiocarbonated polyvinyl alcohol was suspended in about 100 parts of water, filtered on a Büchner funnel and thoroughly washed with water (150–200 parts). The resultant product was next dispersed in an emulsion prepared from 4.0 parts of acrylonitrile, 45 parts of water, 0.2 part of Tween–85 and 1.5 parts of 30% hydrogen peroxide. The polymerization mixture was then adjusted to a pH of about 3.0 with 10% hydrochloric acid. Upon standing at room temperature for 18 hours, the copolymerized polyvinyl alcohol was removed from the polymerization mixture and thoroughly washed with water. The dried product weighed 7.42 parts which constitutes an 82.5% yield of the theoretical. Prolonged extraction in dimethylformamide indicated that 80% of the monomer which had been converted to polymer could not be extracted.

Example 17a

Five parts of polyvinyl alcohol (du Pont's Elvanol 72–60) were placed in a beaker and enough sodium bicarbonate (saturated) solution was added to cover the polyvinyl alcohol. The mixture was allowed to stand at room temperature for about ¼ hour and then filtered on a Büchner funnel. The alkaline-wet polyvinyl alcohol was placed in an evacuated vacuum desiccator over carbon disulfide for about 21 hours, after which the dithiocarbonated polyvinyl alcohol was suspended in about 100 parts of water, filtered, and thoroughly washed with water (150–200 parts). The dithiocarbonated polyvinyl alcohol was then dispersed in an emulsion containing 4.5 parts of ethyl acrylate, 45 parts of water, 0.2 part of Tween–85 and 1.5 parts of 30% hydrogen peroxide. The polymerization mixture was adjusted to a pH of about 3.0 with 10% hydrochloric acid. After 18 hours, the copolymerized polyvinyl alcohol was washed with water and dried. The product yield amounted to 7.70 parts which constitutes 81.5% yield of the theoretical. Prolonged extraction in acetone indicated that 60.3% of the monomer which had been converted to polymer could not be extracted.

Examples 18a–21a

Five parts of polyvinyl alcohol were placed in a beaker containing sufficient 0.25 M sodium aluminate solution to cover it completely for ¼ hour and then dithiocarbonated as described in Example 15a. The sodium dithiocarbonate salt was suspended in each of the following polymerization media:

| Example | Monomer | Procedure | Percent yield | Percent non-extractable polymer |
|---|---|---|---|---|
| 18a | Ethyl acrylate | Example 10a | 70 | 67 |
| 19a | Acrylamide | Example 9a | 66 | 100 |
| 20a | Acrylonitrile | Example 1a | 70 | 83 |
| 21a | Styrene/acrylonitrile | Example 8a | 70 | 51 |

Example 22a

Ten parts of hydroxyethyl cellulose (Rayonier, Ethylose F) were soaked in 1% sodium hydroxide solution for about ½ hour and dithiocarbonated as described in Example 1a. The dithiocarbonated derivative was then suspended in an emulsion prepared from 8.0 parts acrylonitrile, 240 parts water, 0.4 part Tween–85 and 2.5 parts hydrogen peroxide (30%). After 20 hours, the copolymerized hydroxyethyl cellulose was washed well with water. The dried product amounted to an 82% yield of the theoretical (14.8 parts). Extraction with dimethylformamide indicated that 50% of the monomer which had been converted to polymer could not be extracted.

Example 23a

Ten parts of ethyl cellulose (Hercules N–10–S) were suspended in a dispersion of 2 parts carbon disulfide with 98 parts 0.25% sodium hydroxide solution. After about 2 hours, the mixture was filtered on a Büchner funnel and washed with water (350–400 parts) in order to remove completely all soluble products which had formed during the dithiocarbonation process. After the water wash, the dithiocarbonated ethyl cellulose was dispersed in an emulsion consisting of 8.0 parts acrylonitrile, 40 parts water, 0.4 part Tween–85 and 2.5 parts 30% hydrogen peroxide. After 18 hours, the copolymerized ethyl cellulose was washed well with water and dried. The final product weighed 13.7 parts which constitutes a 76% yield of the theoretical.

Example 24a

Ten parts of cellulose acetate staple were placed in a beaker containing 200 parts of 0.75 M sodium hydroxide solution for about ¾ hour and dithiocarbonated as described in Example 1a. The dithiocarbonated derivative was then suspended in an emulsion prepared from 8.0 parts acrylonitrile, 90 parts water, 0.4 part Tween–85 and 3.0 parts of 30% hydrogen peroxide. After 20 hours, the copolymerized substrate was washed well with water and dried. The product weighed 10.3 parts and was found to contain 16.6% nitrogen which indicates an 81.5% conversion of monomer to polymer (6.5 parts polyacrylonitrile).

Extraction of this product with dimethylformamide showed that 72% of the monomer which had been converted to polymer could not be extracted.

Example 25a

Ten parts cyanoethylated cellulose fiber (5.3% nitrogen) were placed in a beaker containing sufficient 0.25 M sodium hydroxide solution to cover it completely for ¼ hour and then dithiocarbonated as described in Example 1a. This dithiocarbonate was then suspended in an emulsion prepared from 8.0 parts acrylonitrile, 100 parts water, 0.5 part Tween–85 and 3 parts of 30% hydrogen peroxide. After 18 hours, the copolymerized product was washed with water and dried. The yield of product amounted to 14.45 parts, which constitutes 81.0% yield of the theoretical. Prolonged extraction in dimethylformamide indicated that 72.5% of the monomer which had been converted to polymer could not be extracted.

*Examples 26a–31a*

A number of 5-part samples of polyvinyl alcohol were prepared and reacted as described in Example 1a with the exception that the acrylonitrile was replaced with other monomers. The results of these substitutions are listed below:

| Ex. | Monomers | Wt. of monomer used (gr.) | Percent Conversion of monomer to polymers on substrate | Percent nonextractable polymers |
|---|---|---|---|---|
| 26a | n-Butyl acrylate | 4.5 | 71 | 69 |
| 27a | Glycidyl acrylate | 5.0 | 83 | 62 |
| 28a | Methacrylamide* | 5.0 | 68 | 100 |
| 29a | Methyl methacrylate | 5.0 | 79 | 71 |
| 30a | Hydroxypropyl methacrylate | 4.5 | 75 | 65 |
| 31a | Vinylidene chloride | 5.0 | 67 | 61 |

*Tween-85 was omitted in this reaction.

*Example 32a–37a*

A series of 5-part samples of polyvinyl alcohol were prepared and treated as described in Example 5a. Ferration was accomplished by suspending the dithiocarbonated substrate for about 1 minute in a 0.004% aqueous ferrous ammonium sulfate solution. Copolymerization was effected with a variety of monomers in place of acrylonitrile. The results were as follows:

| Ex. | Monomers | Wt. of monmer used (gr.) | Percent Conversion of monomer to polymers on substrate | Percent nonextractable polymers |
|---|---|---|---|---|
| 32a | N,N,-diethylaminoethyl acrylate | 5.0 | 68 | 100 |
| 32a | 2-ethylhexyl acrylate | 4.3 | 70 | 72 |
| 34a | Vinyl acetate | 4.0 | 75 | 70 |
| 35a | Styrene | 4.0 | 82 | 60 |
| 36a | Sodium p-styrene sulfonate.* | 5.0 | 69 | 65 |
| 37a | Vinylidene chloride | 5.0 | 80 | 70 |

*Tween-85 was omitted in this reaction.

*Example 1b*

Ten parts of polyvinyl alcohol (du Pont's Elvanol 72–60) were placed in a beaker containing enough 0.063 M sodium hydroxide solution to cover it completely for ¼ hour and then filtered on a Büchner funnel. This alkaline-wet alcohol was then placed in a gas drying tower, the outlet of which led to a mercury reservoir so that a slight gas pressure could be maintained within the drying tower. The inlet part of the drying tower was connected to a cylinder of carbonyl sulfide and sufficient carbonyl sulfide was flushed through the system to displace the air and to maintain a slight pressure to the atmosphere of carbonyl sulfide remaining over the alkaline-wet polyvinyl alcohol. After about 20 minutes' exposure time to the carbonyl sulfide, the polyvinyl alcohol monothiocarbonate was suspended and mixed in about 100 parts of water, filtered on a Büchner funnel, and washed on the Büchner funnel with water (300–400 parts) in order to remove all soluble by-products which had formed during the monothiocarbonation process. After washing, the moist monothiocarbonated polyvinyl alcohol was dispersed in a previously prepared emulsion consisting of 8.1 parts acrylonitrile, 50 parts water, 1.0 part Tween-85 (a polyoxyethylene sorbitantrioleate), and 3.0 parts of 30% hydrogen peroxide and adjusted to a pH of about 5.0 with 10% hydrochloric acid. After standing at room temperature (22°–25° C.) for 18 hours the polyvinyl alcohol copolymer was removed from the polymerization mixture and thoroughly washed with water. The product, oven dried, weighed 14.10 parts, which constitutes a 78.2% yield of the theoretical. Prolonged extraction of this material with dimethylformamide indicated that 75.7% of the monomer which had been converted to polymer was nonextractable.

*Example 2b*

Ten parts of polyvinyl alcohol were monothiocarbonated in the manner described in Example 1b. Immediately after washing, the monothiocarbonated polyvinyl alcohol was suspended in an emulsion prepared from 9.25 parts ethyl acrylate, 50 parts water, 1.0 part Tween-85 and 3.0 parts of 30% hydrogen peroxide and adjusted to a pH of about 5.0 with 10% hydrochloric acid. After 18 hours' contact at room temperature with this emulsion, the polyvinyl alcohol copolymer was washed well with water and dried. The yield of copolymer amounted to 15.8 parts which constitutes an 82.0% yield of the theoretical. Prolonged extraction in acetone showed that 80.1% of the monomer which had been converted to copolymer could not be removed.

*Example 3b*

Ten parts of polyvinyl alcohol were monothiocarbonated and washed in the manner described in Example 1b, and dispersed in a solution consisting of 10.0 parts acrylamide, 50 parts water and 3.0 parts 30% hydrogen peroxide and adjusted to a pH of about 5.0 with 10% hydrochloric acid. After 18 hours at room temperature (22°–25° C.), the product was washed thoroughly with warm water and dried. The yield of copolymer amounted to 11.9 parts which constitutes a 19% conversion of monomer to unextractable polymer.

*Example 4b*

Ten parts of polyvinyl alcohol were monothiocarbonated and washed as described in Example 1b and suspended in an emulsion consisting of 7.9 parts styrene, 1.0 part acrylonitrile, 2.0 parts Tween–85, 50 parts water and 3.0 parts 30% hydrogen peroxide and adjusted to a pH of about 5.0 with 10% hydrochloric acid. After standing at room temperature for 18 hours, the product was removed from the polymerization mixture and thoroughly washed with water. The product, oven dried, weighed 15.4 parts which constitutes an 81.6% yield of the theoretical. Prolonged extraction of this material in trichloroethane indicated that 61.1% of the monomer which had been converted to polymer was nonextractable.

*Example 5b*

Ten parts of polyvinyl alcohol were monothiocarbonated in the manner described in Example 1b. The monothiocarbonated polyvinyl alcohol was then washed thoroughly on a Büchner funnel with water to remove soluble by-products and then 100 parts of 0.06 M lead acetate solution were passed over and through the polyvinyl alcohol derivative to form lead polyvinyl alcohol monothiocarbonate by metathesis. The lead product, after washing with sufficient water (150–200 parts) to remove excess lead ions, was dispensed in an emulsion such as that described in Example 4b.

After standing for 18 hours at room temperature, the copolymer was removed and washed well with water. Upon drying, the copolymer weighed 14.05 parts, which constituted at 74.5% yield of the theoretical. Extraction with ethylene trichloride revealed that 66.8% of the monomer which had been converted to polymer was nonextractable.

*Examples 6b–9b*

Ten parts of PVA were monothiocarbonated and converted to various polyvinyl alcohol monothiocarbonate salts by metathesis in the manner described in Example 5b. The monothiocarbonate derivatives were suspended for 18 hours in various polymerization mixtures before being processed for yields.

Some of the results, representative of the various polyvinyl alcohol monothiocarbonates and polymerization media used are listed below:

| Ex. | Cation | Monomer | Procedure | Percent yield | Percent nonextractable polymer |
|---|---|---|---|---|---|
| 6b | Zinc | Acrylonitrile | Ex. 1b | 70.8 | 61.8 |
| 7b | Cobalt | Ethyl acrylate | Ex. 2b | 67.4 | 66.8 |
| 8b | Nickel | Acrylamide | Ex. 3b | 63.5 | 100.0 |
| 9b | Ferrous | Styrene/acrylonitrile | Ex. 4b | 73.5 | 50.1 |

*Examples 10b–13b*

Ten parts of polyvinyl alcohol were placed in a beaker containing sufficient 0.0875 M sodium silicate solution to cover it completely for 10 minutes and then monothiocarbonated as described in Example 1b. Sodium monothiocarbonate salts as prepared above were suspended in each of the following polymerization media with the result of each shown:

| Ex. | Monomer | Procedure | Percent yield | Percent nonextractable polymer |
|---|---|---|---|---|
| 10b | Acrylonitrile | Example 1b | 84.5 | 83.0 |
| 11b | Ethyl acrylate | Example 2b | 76.7 | 71.3 |
| 12b | Acrylamide | Example 3b | 68.2 | 100.0 |
| 13b | Styrene/acrylonitrile | Example 4b | 79.2 | 58.7 |

*Examples 14b–19b*

Ten parts of polyvinyl alcohol were placed in a beaker containing sufficient 0.0875 M sodium silicate solution to cover it completely for 10 minutes and then monothiocarbonated and converted to various polyvinyl alcohol monothiocarbonate salts by metathesis in the manner described in Example 5b. The monothiocarbonate derivatives were suspended for 18 hours in various polymerization mixtures before being processed for yield.

Some of the results, representative of the polyvinyl alcohol monothiocarbonate derivative used and the polymerization medium in which it was suspended, are given below:

| Ex. | Cation | Monomer | Procedure | Percent yield | Percent nonextractable polymer |
|---|---|---|---|---|---|
| 14b | Aluminum | Acrylonitrile | Ex. 1b | 71.5 | 63.0 |
| 15b | Nickel | do | Ex. 1b | 65.0 | 49.9 |
| 16b | Lead | Ethy acrylate | Ex. 2b | 76.8 | 72.9 |
| 17b | Ferrous | do | Ex. 2b | 81.5 | 63.1 |
| 18b | Zinc | Acrylamide | Ex. 3b | 60.4 | 100.0 |
| 19b | Cobalt | Styrene/acrylonitrile | Ex. 4b | 71.7 | 60.8 |

*Example 20b*

Five parts of polyvinyl alcohol were placed in a beaker and enough 0.25 M sodium carbonate was added to cover the polyvinyl alcohol. The mixture was allowed to stand at room temperature for about ½ hour, then filtered on a Büchner funnel. The alkaline-wet polyvinyl alcohol was then monothiocarbonated as described in Example 1b and suspended in a solution of 5.0 parts acrylamide, 50 parts water and 1.5 parts of 30% hydrogen peroxide and adjusted to a pH of about 5.0 with 10% hydrochloric acid. After 18 hours at room temperature, the product was washed thoroughly with warm water and dried. The yield of copolymer amounted to 7.53 parts, which constitutes a 50.6% conversion of monomer to unextractable polymer.

*Example 21b*

Five parts of polyvinyl alcohol were placed in a beaker containing sufficient 5% ammonium hydroxide solution to cover it completely. The mixture was allowed to remain at room temperature for about ½ hour, then filtered on a Büchner funnel to remove excess ammonium hydroxide solution and then monothiocarbonated as described in Example 1b. Immediately after washing, the polyvinyl alcohol monothiocarbonate was suspended in an emulsion prepared from 4.0 parts acrylonitrile, 45 parts water, 0.5 part Tween–85 and 1.5 parts of 30% hydrogen peroxide and adjusted the pH to about 5.0 with 10% hydrochloric acid. After standing at room temperature for 18 hours, the polyvinyl alcohol copolymer was removed from the polymerization mixture and thoroughly washed with water. The product, oven dried, weighed 6.78 parts, which constitutes a 74.2% yield of the theoretical. Prolonged extraction of this material with dimethylformamide indicated that 73.1% of the monomer which had been converted to polymer was nonextractable.

*Example 22b*

Five parts of polyvinyl alcohol were placed in a beaker and enough 0.25 M methylamine was added to cover the polyvinyl alcohol. The mixture was allowed to stand at room temperature for about ½ hour and then filtered on a Büchner funnel. The moist polyvinyl alcohol was monothiocarbonated as described in Example 1b and suspended in an emulsion consisting of 3.75 parts styrene, 0.25 part acrylonitrile, 45 parts of distilled water, 0.5 part Tween–85 and 1.5 parts of 30% hydrogen peroxide. The polymerization medium was adjusted to a pH of about 5.0 with 10% hydrochloric acid. Upon standing at room temperature for 18 hours, the copolymerized polyvinyl alcohol was removed from the polymerization mixture and thoroughly washed with water. The dried product weighed 6.57 parts, which constitutes a 73.4% yield of theoretical. Prolonged extraction in ethylene trichloride indicated that 64.7% of the monomer which had been converted to polymer could not be extracted.

*Example 23b*

Five parts of polyvinyl alcohol were placed in sufficient 0.0875 M sodium sulfide to cover it completely. The mixture was allowed to stand at room temperature for about ½ hour, then filtered on a Büchner funnel and monothiocarbonated as described in Example 1b. Immediately after washing, the sodium polyvinyl alcohol monothiocarbonate was added to an emulsion prepared from 4.5 parts ethyl acrylate, 45 parts water, 0.2 part Tween–85 and 1.5 parts of 30% hydrogen peroxide. The polymerization mixture was adjusted to a pH of about 5.0 with 10% hydrochloric acid. After 18 hours at room temperature, the polyvinyl alcohol copolymer was washed with water and dried. The copolymeric product amounted to 7.05 parts, which constitutes a 74.0% yield of the theoretical. Prolonged extraction of the product with acetone indicated that 86.3% of the monomer which had been converted to polymer could not be extracted.

*Example 24b*

Five parts of polyvinyl alcohol were monothiocarbonated as described in Example 23b and converted by metathesis to cobalt polyvinyl alcohol monothiocarbonate by substituting 0.06 M cobalt chloride for 0.06 M lead acetate as described in Example 5b, and then suspended in an emulsion prepared from 3.75 parts styrene, 0.25 part acrylonitrile, 45 parts water, 0.5 part Tween–85 and 1.5 parts of 30% hydrogen peroxide. The polymerization mixture was adjusted to a pH of about 5.0 with 10% hydrochloric acid.

After standing at room temperature for 18 hours, the copolymer was removed from the polymerization medium and thoroughly washed with water. The product, oven dried, weighed 6.55 parts, which constitutes a 72.8% yield of the theoretical. Prolonged extraction of this material with ethylene trichloride indicated that 61.2% of the monomer which was converted to polymer could not be extracted.

*Example 25b*

Ten parts of hydroxyethyl cellulose (Rayonier, Ethylose F) were soaked in 1% sodium hydroxide solution for about 5 minutes and monothiocarbonated as described in Example 1b. This monothiocarbonate derivative was then suspended in an emulsion prepared from 16.0 parts acrylonitrile, 80 parts water, 2.0 parts 10% hydrochloric acid, 0.5 part Tween-85 and 3.0 parts of 30% hydrogen peroxide. After 20 hours, the copolymerized hydroxyethyl cellulose was washed well with water. The product, oven dried, weighed 15.6 parts which, constitutes a 60.0% yield of theoretical. Prolonged extraction with dimethylformamide indicated that 75.0% of the monomer which had been converted to polymer could not be extracted.

*Example 26b*

Five parts of ethyl cellulose (Type N-10-S Hercules) were soaked in 0.25% sodium hydroxide solution for about 5 minutes and monothiocarbonated as described in Example 1b. This monothiocarbonate derivative was then suspended in an emulsion prepared from 3.75 parts styrene, 0.25 part acrylonitrile, 20 parts water, 0.3 part Tween-85, 2 parts 10% hydrochloric acid and 1.5 parts of 30% hydrogen peroxide. After 60 hours at room temperature, the copolymer was washed with water and dried. The product weighed 6.00 parts, which constitutes a 67% yield of the theoretical.

*Example 27b*

Ten parts of cellulose acetate staple were placed in a beaker containing 200 parts of 0.75 M sodium hydroxide solution for about ¾ hour and then monothiocarbonated as described in Example 1b. The monothiocarbonate salt was suspended in a solution consisting of 10 parts acrylamide, 90 parts water, 2 parts 10% hydrochloric acid and 3.0 parts of 30% hydrogen peroxide. After 60 hours at ambient temperature, the copolymerized cellulose was washed well with water and dried. The product weighed 7.9 parts and was found to contain 5.92% nitrogen which indicates at 24% conversion of monomer to unextractable polymer (2.4 parts polyacrylamide).

*Example 28b–32b*

A number of 10-part samples of polyvinyl alcohol were treated and reacted in the manner described in Example 1b with the exception that a variety of monomers were substituted for acrylonitrile. The results of these reactions are tabulated below:

| Ex. | Monomer | Wt. of monomer used (gms.) | Percent conversion of monomer to polymer on substrate | Percent nonextractable polymer |
|---|---|---|---|---|
| 28b | Methyl acrylate | 8.0 | 78 | 80 |
| 29b | 2-cyanoethyl acrylate | 9.0 | 85 | 81 |
| 30b | Hydroxyethyl acrylate | 8.0 | 80 | 70 |
| 31b | Ethyl methacrylate | 9.3 | 81 | 75 |
| 32b | Glycidyl methacrylate | 8.0 | 78 | 80 |

*Examples 33b–35b*

A series of 5-part samples of polyvinyl alcohol were treated and reacted in the manner described in Example 9b. Various monomers were used in place of styrene acrylonitrile and the results are shown below:

| Ex. | Monomer | Wt. of monomer used (gr.) | Percent Conversion of monomer to polymer on substrate | Percent nonextractable polymer |
|---|---|---|---|---|
| 33b | Methacrylic acid* | 5.0 | 68 | 100 |
| 34b | Vinyl toluene | 5.0 | 75 | 64 |
| 35b | Vinylidene chloride | 5.0 | 72 | 50 |

*Tween-85 was omitted in this reaction.

The usefulness of the products which may be prepared by the practice of this invention is quite evident. To one knowledgeable in the properties of synthetic polymers and copolymers, innumerable combinations of monomers and synthetic substrates readily suggest themselves as having useful and novel properties. By way of example, improved cellulose acetate and polyvinylalcohol fibers may be obtained by the copolymerization of these substrates with such monomers as acrylonitrile, various alkylarylates, and styrene. Adhesives with improved bonding ability result from acrylic or methacrylic acid copolymers of hydroxyethylcellulose and polyvinyl alcohol. Cellulose acetate copolymers of ethyl acrylate is a fine water resistant bonding agent for nonwoven fabrics. Copolymers of acrylic acid or N,N-diethylaminoethylmethacrylate with various hydroxylated, synthetic substrates constitute useful cationic and anionic ion-exchange materials. Styrene, butylacrylate and stearylacrylate copolymers of these substrates, to name only a few, find use as molding powders.

The herein-described graft polymerization inventions utilizing thioated substrate can be defined as a process of producing a copolymer of ethylenicaly unsaturated compounds and thioated substrates as defined herein which comprises reacting a water insoluble thiocarbonate derivative of a synthetic polymer as defined herein, via peroxidic free-radical initiation, with at least one ethylenically unsaturated monomer, preferably wherein (a) The thiocarbonate derivative is employed, or
(b) The monomer is uniformly distributed in water, e.g., as a solution, an emulsion or as a mechanical dispersion, or
(c) The reaction media contains a wetting agent, or
(d) The thiocarbonate derivative is an alkali-metal salt, e.g., the sodium salt, or
(e) The thiocarbonate derivative is a salt of at least one metal selected from the group consisting of metals in the Periodic Table's Groups Ib, IIa, IIb, IIIa, IIIb, IVb, Vb, VIb, VIIb, VIII, Ge, Sn, Pb, and Bi; or
(f) The thiocarbonate derivative is a salt of at least one member of the group consisting of ammonia, primary, secondary, tertiary amine, quaternary ammonium, tertiary sulfonium, quaternary phosphonium, quaternary arsonium and quaternary stibonium salt, e.g., a salt is formed from a trimethylsulfonium precursor or the salt is tetrakis (hydroxymethyl) phosphonium; included in the above-described inventions are the products obtained by the process defined by (f); or
(g) The monomer is selected from the group consisting of CHR=CHR; $H_2C=CR_2$; $R_2C=CR_2$ and

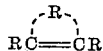

wherein R is selected from at least one member of the group consisting of (1) hydrogen; (2) alkyl group; (3) alkene group; (4) alkyne group; (5) aryl group; (6) substituted aryl group; (7) an electronegative group; (8) an alicyclic group; (9) a heterocyclic group; (10) a substituted heterocyclic group; (11) a carbalkoxy group of the general formula

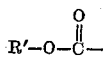

wherein R' is selected from the group consisting of hydrogen, R, hydrocarbons of from 1 to 18 carbon atoms, and substituted hydrocarbons of from 1 to 18 carbon atoms; (12) groups of the general formula

(13) groups of the general formula

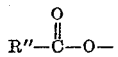

(14) groups of the general formula R"—O—; (15) groups of the general formula

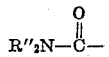

wherein R" is selected from at least one member of the group consisting of hydrogen, R, and R', hydrocarbons of from 1 to 18 carbon atoms, substituted hydrocarbons of from 1 to 18 carbon atoms, and aliphatic groups of from 1 to 18 carbon atoms, especially wherein the thiocarbonate derivative is the dithiocarbonate derivative; or (h) The thiocarbonate derivative is a salt selected from at least one member of the group consisting of ammonia, primary, secondary, tertiary amine, quaternary organic ammonium, tertiary sulfonium, quaternary phosphonium, quaternary arsonium, quaternary stibonium, lithium, sodium and potassium, or a water-soluble salt of at least one metal selected from the group consisting of metals in the Periodic Table's Groups I$b$, II$a$, II$b$, III$a$, III$b$, IV$b$, V$b$, VI$b$, VII$b$, VIII, Ge, Sn, Pb and Bi, which is reacted with the monomer dispersed in an aqueous solution, especially wherein the monomer is acrylamide, acrylic acid, acrylonitrile, a mixture of styrene and 2-ethylhexylacrylate or a mixture of acrylonitrile and styrene, especially wherein the thiocarbonate salt is a dithiocarbonate salt and more preferably wherein the dithiocarbonate salt is selected from at least one member of the group consisting of an alkali metal, ammonia and water-soluble amines, or is a ferrous, or ferric salt; included in the invention are the products obtained according to the process defined in (h), especially the products wherein the salt is ferrous, sodium or ammonium; or (i) The thiocarbonate derivative is mixed with the monomer in an aqueous solution in which the monomer is uniformly distributed, the peroxidic free-radical initiator is added to the solution containing the thiocarbonate salt derivative and the monomer, the reaction is allowed to proceed at a temperature of from 0° to 100° C. of from about 3 minutes to about 96 hours, and the formed copolymer is thereafter recovered from the solution, or;

(j) The thiocarbonate derivative is produced by reacting the corresponding water-insoluble substrate, which is wet with an aqueous solution of a base, with carbon disulfide or carbonyl sulfide, especially carbon disulfide; the base preferably being a metal base, more preferably an alkali-metal hydroxide and especially sodium hydroxide; desirably by the steps of wetting the polymeric material with an aqueous solution of the selected base, separating the solution from the polymer wet with base, and exposing the polymer wet with base to the vapors of carbon disulfide or carbonyl sulfide or a solution thereof in an inert solvent; desirably also performing the last of the aforesaid steps substantially immediately after wetting the polymeric substrate with the base; and desirably also thereafter washing the resulting copolymer with water to remove any excess monomer and soluble by-products of the reaction; plus all possible combinations of the above.

What is claimed is:

1. The process which comprises the steps of wetting with an alkaline solution a water-insoluble, synthetic, hydroxyl group-containing polymer or a water-insoluble, synthetic polymer containing a group hydrolyzable to a hydroxyl group; bringing the alkaline-wet polymer in intimate contact with carbon disulfide or carbonyl sulfide to produce a water-insoluble thioated derivative of the polymer; washing the resulting thioated derivative to remove the water-soluble by-products of the thioate formation or thioate substrate decomposition; and reacting the resulting thioated derivative, via free radical initiation, with at least one ethylenically unsaturated monomer.

2. The products obtained according to the process of claim 1.

3. The process acocrding to claim 1 wherein the thiocarbonate derivative is a dithiocarbonate derivative.

4. The process according to claim 3 wherein the synthetic polymer is a cellulose ester of cellulose ether.

5. The products obtained according to the process of claim 4.

6. The process according to claim 3 wherein the synthetic polymer is a polymer of an ethylenically unsaturated monomer.

7. The process according to claim 3 wherein the synthetic polymer is a member of the group consisting of polyvinyl alcohol, polyvinyl acetate, a copolymer of vinyl acetate and a different copolymerizable olefinic monomer, the hydrolysis products thereof, polymers of hydroxyethylacrylate, polymers of hydroxyethylmethacrylate, and polymers of hydroxypropylacrylate and hydroxypropylmethacrylate.

8. The products obtained according to the process of claim 7.

9. The process according to claim 1 wherein the graft polymerization is conducted in an aqueous polymerization system in which the monomer is uniformly distributed.

10. The process according to claim 9 wherein the thiocarbonate derivative is a dithiocarbonate.

11. The process according to claim 9 wherein the peroxidic initiator is hydrogen peroxide.

12. The process according to claim 9 wherein the reaction is conducted in water.

13. The process according to claim 12 wherein the reaction is conducted in the presence of at least one member of the group consisting of an emulsifying agent sufficient to form a stable emulsion and a wetting agent.

14. The process according to claim 1 wherein the thiocarbonate derivative is a salt of at least one member of the group selected from ammonium, primary, secondary, tertiary amine, quaternary ammonium, tertiary sulfonium, quaternary phosphonium, quaternary arsonium, quaternary stibonium, lithium, sodium, potassium, Ge, Sn, Pb, Bi and metals in the Periodic Table's groups I$b$, II$a$, II$b$, III$a$, III$b$, IV$b$, V$b$, VI$b$, VII$b$, and VIII.

15. The process according to claim 14 wherein the thiocarbonate derivative is a dithiocarbonate derivative.

16. The process according to claim 14 wherein the salt is an ammonium salt.

17. The process according to claim 14 wherein the salt is the sodium salt.

18. The process according to claim 14 wherein the salt is the ferrous salt.

19. The process according to claim 1 which includes the step of converting a thiocarbonate salt of the synthetic polymer metathetically to another salt thereof.

20. The process according to claim 19 wherein the salt converted metathetically to another salt is the sodium or ammonium salt.

21. The process according to claim 19 wherein the metathetically produced salt is the salt of a metal selected from the group consisting of Ge, Sn, Pb, Bi and metals in the Periodic Table's Groups I$b$, II$a$, II$b$, III$a$, III$b$, IV$b$, V$b$, VI$b$, VII$b$, and VIII.

22. The process according to claim 1 wherein the thiocarbonate derivative is a thiocarbonate salt produced by reacting metathetically a thiocarbonate salt of at least one member of the group consisting of ammonia, primary, secondary, tertiary amine, quaternary ammonium, tertiary sulfonium, quaternary phosphonium, quaternary arsonium, quaternary stibonium, lithium, sodium and potassium with a water-soluble salt of at least one metal selected from the group consisting of Ge, Sn, Pb, Bi and metals in the Periodic Table's Groups Ib, IIa, IIb, IIIa, IIIb, IVb, Vb, VIb, VIIb, and VIII.

23. The process according to claim 22 wherein the thiocarbonate derivative is a dithiocarbonate derivative.

24. The process according to claim 1 wherein the monomer has an ethylenic group at an unsubstituted terminal carbon atom.

25. The process according to claim 24 wherein the thiocarbonate is a dithiocarbonate salt.

26. The process according to claim 1 wherein the monomer is at least one member of the group consisting of CHR=CHR; H₂C=CR₂ and R₂C=CR₂ wherein R is selected from at least one member of the group consisting of (1) hydrogen; (2) alkyl group; (3) alkene group; (4) alkyne group; (5) an aryl group; (6) an alicyclic group; (7) a heterocyclic group; (8) a carbalkoxy group of the general formula

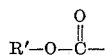

(9) groups of the general formula

(10) groups of the general formula

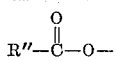

(11) groups of the general formula R″—O—; and (12) groups of the general formula

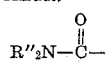

wherein R′ and R″ are selected from a member of the group consisting of hydrogen and hydrocarbons of from 1 to 18 carbon atoms.

27. The process according to claim 26 wherein the thiocarbonate derivative is dithiocarbonate.

28. The process according to claim 26 wherein the monomer is acrylic acid.

29. The process according to claim 26 wherein the monomer is acrylonitrile.

30. The process according to claim 26 wherein the monomers are acrylonitrile and styrene.

31. The process according to claim 26 wherein the monomer is vinylidene chloride.

32. The process according to claim 26 wherein the monomer is acrylamide.

33. The process according to claim 1 wherein carbon disulfide is employed.

34. The process according to claim 1 wherein the alkaline solution is an alkali-metal hydroxide solution.

35. The process according to claim 1 wherein the synthetic polymer is wet with aqueous sodium hydroxide of up to 0.05 molar concentration and the alkaline-wet synthetic polymer is contacted with carbon disulfide.

No references cited.

WILLIAM H. SHORT, *Primary Examiner.*

J. NORRIS, *Assistant Examiner.*